(Model.)

G. M. BEERBOWER.
BARBED FENCE.

No. 327,755. Patented Oct. 6, 1885.

WITNESSES:
W. W. Hollingsworth
W. X. Stevens.

INVENTOR:
Geo. M. Beerbower
BY Munn & Co.
ATTORNEYS.

UNITED STATES PATENT OFFICE.

GEORGE MARSHALL BEERBOWER, OF CHERRY VALE, KANSAS.

BARBED FENCE.

SPECIFICATION forming part of Letters Patent No. 327,755, dated October 6, 1885.

Application filed October 20, 1884. Serial No. 146,050. (Model.)

*To all whom it may concern:*

Be it known that I, GEORGE M. BEERBOWER, a citizen of the United States, residing at Cherry Vale, in the county of Montgomery and State of Kansas, have invented a new and useful Barbed Fence-Wire, of which the following is a specification.

My invention relates to improvements in barbs for fence-wire to prevent animals from disturbing the wire; and the objects of my invention are, first, to provide a barb for fence-wire that will not mutilate or injure animals; second, to reduce the cost of manufacture of barbed wire. I attain these objects by the device illustrated in the accompanying drawings, in which—

Figure 1:
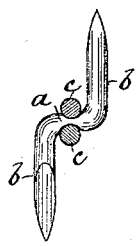
Figure 2:
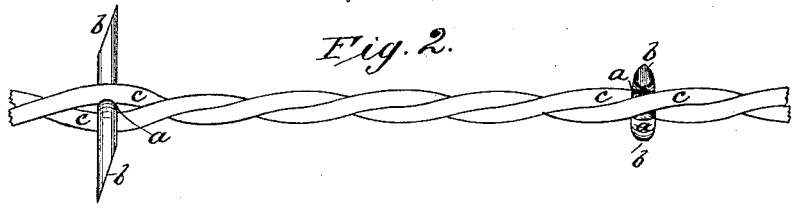
Figure 3:
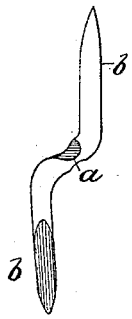

Figure 1 is a view of the barb as shown in cross-section of the wire; Fig. 2, on the left a side view, and on the right an end view, showing the relative positions in which the barbs are placed in the wire. Fig. 3 is a perspective view of my fence-barb.

Similar letters refer to similar parts throughout the several views.

The shaft $a$ has a point, $b$, turned at right angles to the shaft at each end and pointing in opposite directions. The shaft $a$ is flattened, so that the pressure together of the two wires $c\ c$ will tend to hold the points $b$ at right angles to the wire $c$, and the elasticity of the wires $c\ c$ will admit of the points $b$ inclining in either direction in planes parallel with the fence when animals come in contact with them, and prevent lacerating their flesh, as a rigid barb will do. The damage to stock by fence-barbs is not so much due to the barbs pushing endwise into the animal as to tearing gashes along his sides. The reason for this is that animals seldom run against a fence so squarely as not to slip along the wire, when the projecting barbs tear them. My barb being practically journaled on its flattened middle portion between and transversely to the fence-wires, and its points standing at right angles to its own axis, the said points will yield along the fence by swinging on the journal, and the contraction of the fence-wires bearing on the flattened portion will return the points to a position transverse to the fence as soon as the barbs are released.

I am aware that prior to my invention barbs have been made to prevent animals from disturbing the wires of fences. Therefore, I do not claim this, broadly; but What I do claim as my invention, and desire to secure by Letters Patent, is—

1. A wire-fence barb having a flat central portion and two pointed ends standing nearly at right angles to the plane of the said flat portion, substantially as shown and described.

2. The combination, with two fence-wires twisted together, of a barb having a flat central portion and two pointed ends standing nearly at right angles to the plane of the said flat portion, the barb being held between the fence-wires, which grasp the said flat portion of the barb, substantially as shown and described, whereby the barb is journaled between the fence-wires to swing parallel with the fence and to be sprung back to a position transverse to the said wires by the action of the latter, as set forth.

GEORGE MARSHALL BEERBOWER.

Witnesses:
L. F. DICK,
F. F. WOOD.